Nov. 7, 1967    R. ASHTON ET AL    3,350,863
CORN HARVESTER
Filed Nov. 5, 1964    3 Sheets-Sheet 1
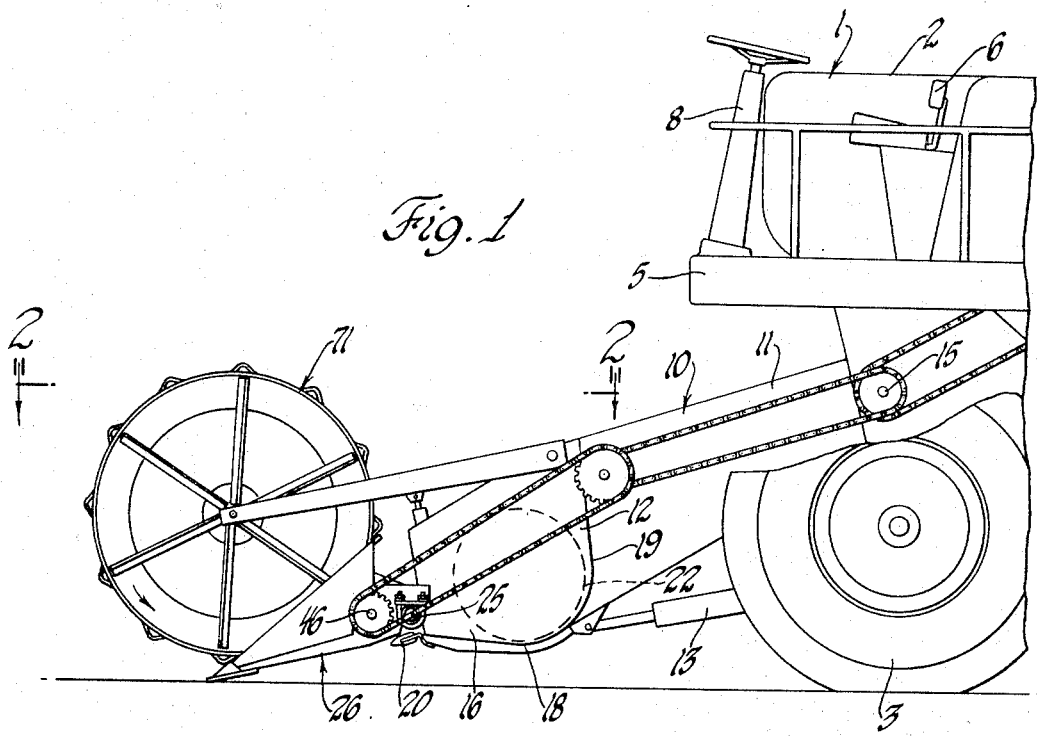
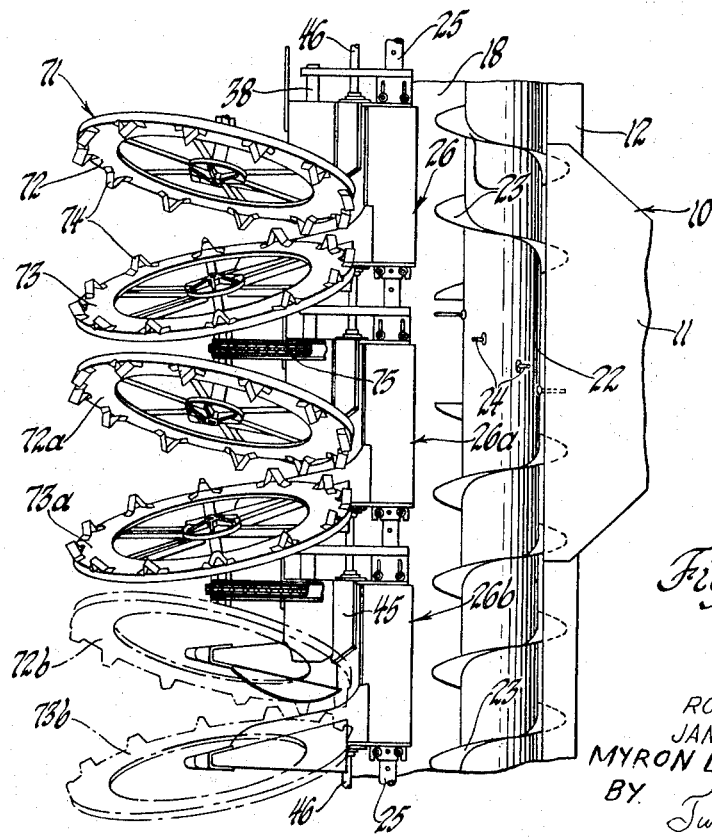
INVENTORS.
ROBERT ASHTON
JAMES G. BUTLER &
MYRON LEROY GULLICKSON
BY Tweedale & Gerhardt
ATTORNEYS.

Nov. 7, 1967         R. ASHTON ET AL         3,350,863
                        CORN HARVESTER

Filed Nov. 5, 1964                    3 Sheets-Sheet 2

INVENTORS.
ROBERT ASHTON
JAMES G. BUTLER &
MYRON LEROY GULLICKSON
BY
Tweedale & Gerhardt
ATTORNEYS.

INVENTORS.
ROBERT ASHTON
JAMES G. BUTLER &
MYRON LEROY GULLICKSON
BY Tweedale & Gerhardt
ATTORNEYS.

3,350,863
CORN HARVESTER
Robert Ashton and James G. Butler, Islington, Ontario, and Myron Leroy Gullickson, Albion Township, Ontario, Canada, assignors to Massey-Ferguson Limited, Toronto, Ontario, Canada
Filed Nov. 5, 1964, Ser. No. 409,135
16 Claims. (Cl. 56—18)

This invention relates generally to gathering and picking units for corn and other row crops, and more particularly to a corn gathering and picking unit that can be attached to the table of a conventional grain combine.

Corn or maize harvesting attachments for combines have generally been of the type including gathering units, snapping rolls, an auger conveyor and feed elevator that is mounted directly on the main body of the combine to replace the entire grain header assembly. In some cases, the entire unit is mounted on the elevator of the combine and extends axially from the elevator to substantially increase the length of the header assembly. The conventional snapping rolls, auger and feed elevator for the corn harvesting attachment are of the type which are disposed parallel with respect to the longitudinal axis of the combine and with respect to the axis of the rows of standing crops.

Such corn harvesting attachments are expensive, heavy and difficult to maneuver in changing from grain harvesting to corn harvesting, and the increased weight projecting forwardly from the front of the combine for a substantial length makes it difficult to maneuver the combine during harvesting. Moreover, the conventional snapping rolls are expensive to manufacture, and difficult to synchronize and adjust with respect to each other for performing their operations.

An object of this invention is therefore to provide a corn harvesting attachment suitable for mounting on the table of conventional combines in which the axial length and amount of overhung weight of the attachment is substantially reduced by positioning the snapping unit transversely with respect to the combine and direction of travel of the combine.

A further object is to provide a corn harvesting attachment in which the conveying and snapping units are combined and are of simplified economical construction.

Still another object is to provide a snapping unit for corn harvesters in which the number of moving parts are reduced to a minimum and which can be quickly and accurately adjusted for accommodating various size stalks.

In carrying out the foregoing, and other objects, the present invention includes a corn picking unit that can be mounted on a conventional grain table for removing ears of corn from standing stalks and depositing the ears on the grain table. The picking unit includes a stripping slot, a stalk feeding and snapping unit for feeding standing stalks into the stripping slot and pulling the stalks downwardly to strip the ears therefrom. For reducing the amount of overhung weight on the end of the grain table and the length of the corn harvesting attachment, the stripping slot, the conveyor and snapping units are all disposed on a transverse axis with respect to the longitudinal axis of the combine. Further, the stalk feeding conveyor and the snapping roll are of combined lightweight construction which cooperate with a stationary, concave plate member for pulling the stalks through the stripping slot to remove the ears. As the ears are removed from the standing stalks, they are deflected onto the grain table where they are collected by the auger conveyor of the table and fed into the combine elevator for further treatment.

Other objects, advantages and features of the invention will become apparent from the following description taken in connection with the accompanying drawings in which:

FIG. 1 is an elevational view of a combine having a corn harvesting attachment embodying the invention mounted thereon;

FIG. 2 is a partial plan view of the table and corn harvesting attachments of FIG. 1;

Figure 3:
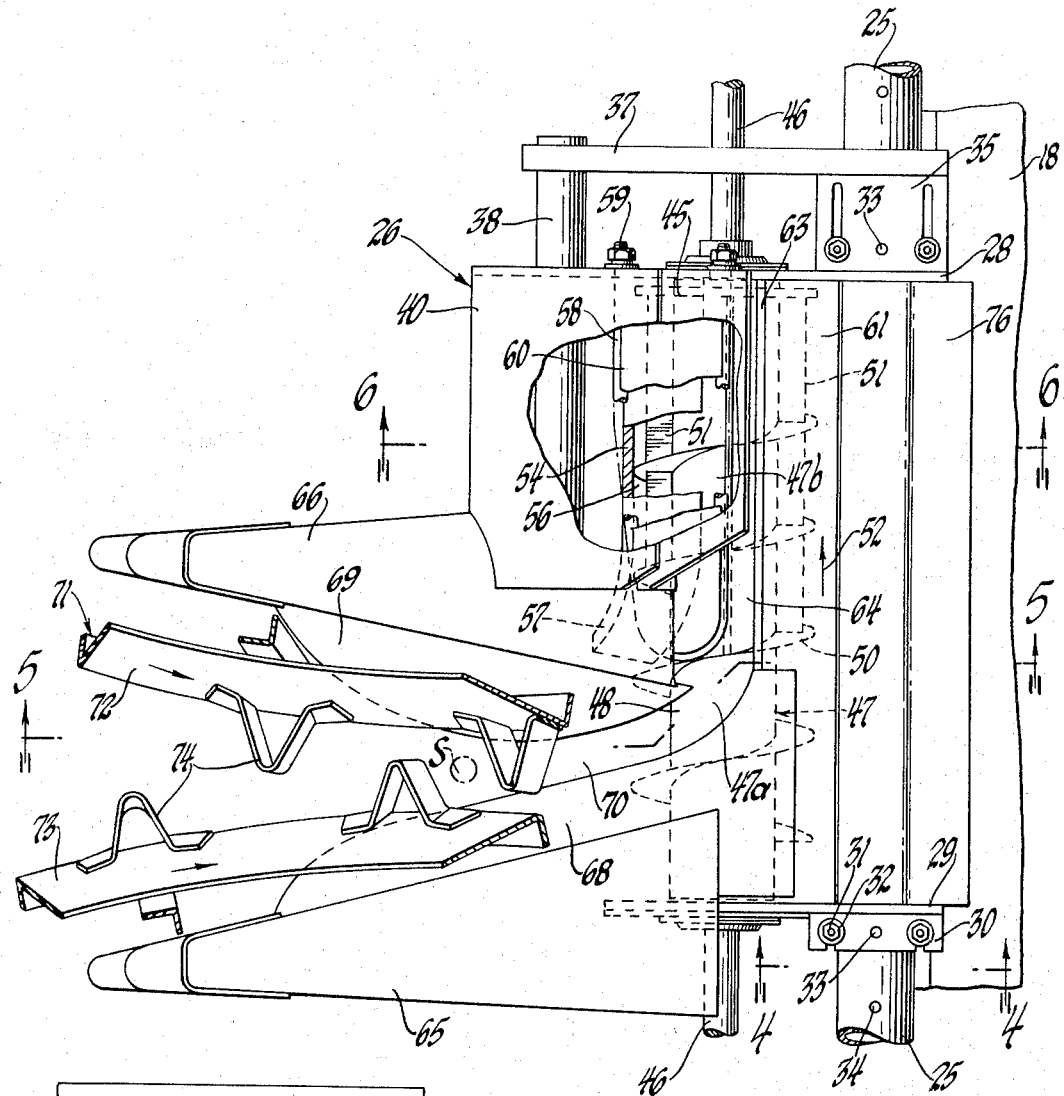
FIG. 3 is an enlarged plan view of the corn harvesting attachment of the invention.
Figure 5:
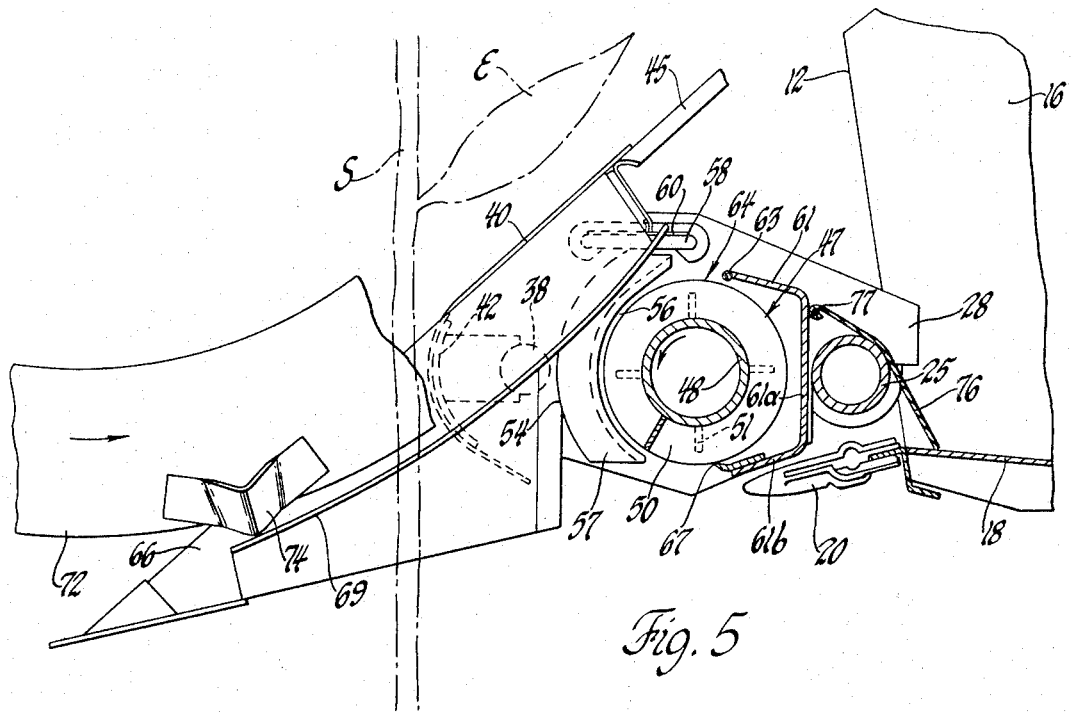
Figure 6:
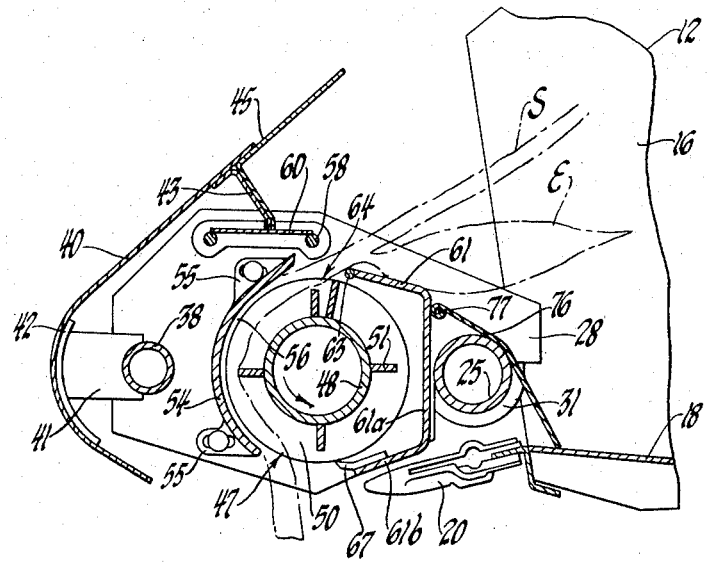

FIGS. 5 and 6 are sectional views taken on lines 5—5 and 6—6, respectively, of FIG. 3.

While the invention will be described in connection with a preferred embodiment, it should be understood that the invention is not limited to specific embodiment illustrated. On the contrary, all alternatives, modifications and equivalents, which may be included within the spirit and scope of the invention are intended to be covered herein.

In FIG. 1, reference numeral 1 designates collectively the forward portion of a combine having a main body 2 supported on front wheels 3 (only one of which is visible in the drawing). Mounted on main body 2 is an operator's platform 5 on which is supported a seat 6 and steering column 8. Supported for vertical, pivotal movement on the forward end of main body 2 is a header assembly 10.

The header assembly 10 includes a conventional feed elevator 11 having an undershot, endless conveyor (not shown) for carrying crop material from the transverse grain table or platform 12 into the threshing and other crop treating mechanism within main body 2. Header assembly 10 is vertically movable about the axis of a shaft 15 by means of a piston and cylinder assembly 13.

Table 12 is generally in the shape of a scoop having end walls 16 joined together by a deck or bottom wall 18 and a rear wall 19. Mounted on the leading edge of deck 18 is a cutter bar 20 for cutting standing grain crops such as wheat, barley and alfalfa, as the combine advances through the crop. When the combine is used for harvesting grain, as opposed to corn (maize) or row crops, a grain reel (not shown) is supported on the table and directs the grain into the cutter bar.

The cut grain falls onto deck 18 where it is carried to the inlet of elevator 11 by a conveyor 22 which is commonly of the auger type rotatably supported between end walls 16 of the table. Auger 22 is provided with oppositely disposed helical flights 23 which direct the grain to the central portion of the table where it is fed into elevator 11 by means of pickup fingers 24 projecting from the auger between the opposed screw flights 23.

For harvesting corn with the present invention, the grain reel is removed from the table and a support bar 25 in the form of tubular member is secured to the lower front edges of end walls 16 by any suitable means (not shown). Mounted on support bar 25 is a plurality of identical corn picking units 26, 26a and 26b having end frame members 28 and 29 (FIG. 3).

Figure 4:
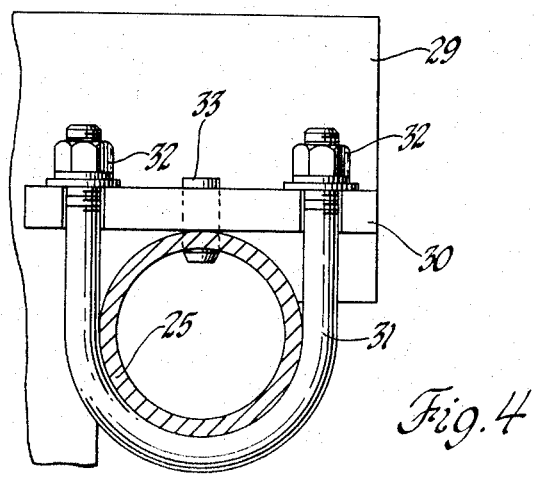
FIG. 4 is a sectional detail view taken on line 4—4 of FIG. 3.

Projecting laterally from end frame 29 (FIG. 3) is a plate 30 having a pair of slotted openings for receiving the ends of a conventional U-bolt 31 (FIG. 4) which extends around support bar 25 and is secured to plate 30 by nuts 32 threaded onto its ends. Movement of picking unit 26 along the axis of bar 25 is prevented by means of a pin 33 received in a central opening in plate 30 and engaging one of a plurality of openings 34 in support bar 25 which is selectively brought into registry with the central opening of plate 30. Extending laterally from end frame 28 is a slotted plate 35 which also receives the ends of a U-bolt and is joined with a support member 37 extending longitudinally from support bar 25. Thus, the position of each picking unit along the axis of support bar 25 may be selectively determined by matching holes 34 with the central openings in plates 30 and 35 in which pin 33 is received.

A housing support bar 38 is mounted on the forward end of support member 37 for supporting a curved housing 40 (FIGS. 3 and 6). The upper edge of housing 40 is supported on a beam member 43 and the downwardly curved edge of an extension 45. Welded, or otherwise fixed to support bar 38 is a bracket member 41 having a curved flange 42 which is complementary to the inner contour of housing 40 for supporting the forward end thereof.

Journalled in end walls 28 and 29 is a shaft 46 on which is mounted a stalk feeding and snapping roll 47 having a cylindrical core 48 around which is wound helical screw flights 50 which, upon counter-clockwise rotation of roll 47 as viewed in FIG. 5, feed material in the direction of arrow 52 of FIG. 3, toward end frame member 28. Roll 47 includes a feeding portion 47a and a snapping portion 47b, the latter portion extending approximately the length of a stationary snapping plate 54. Extending along the length of snapping portion 47b is a plurality of radial blades 51 which operate to pull the corn stalks downwardly to remove the ears therefrom in a manner to be presently described.

Mounted on end frame member 28 and extending in a direction parallel to roll 47 is a stationary snapping plate 54 having a concave inner surface of substantially the same curvature as the periphery of roll 47. Plate 54 is adjustably secured to frame member 28 by slotted fittings 55 to permit it to be moved toward and away from roll 47 to respectively decrease and increase the space 56 between the snapping portion 47a and the inner surface of plate 54. The outer end of plate 54 is flared or bent forwardly as shown at 57 in FIGS. 3 and 5 such that the space 56 between the concave surface of plate 54 and the outer periphery of roll 47 decreases gradually from end 57 to frame member 28.

Mounted above roll 47 and plate 54 is a U-shape rod 58 having its ends mounted in frame member 28 by threaded fasteners 59 on which is mounted a forward stripping plate 60. Stripping plate 60 cooperates with a rear stripping plate 61 pivotally mounted between frame members 28 and 29 to define a stripping slot 64. The rear stripping plate 61 is formed by the upper panel of a generally channel shaped member having a rear depending panel 61a and lower panel 61b which projects forwardly from the lower end of panel 61a. Mounted on the leading edge of panel 61b is a knife bar 67 which operates to clean crop material from the periphery of roll 47 and prevent the crop material from becoming entangled with roll 47.

Projecting forwardly from each picking unit 26 is a pair of gathering dividers or snouts 65 and 66 having guide plates 68 and 69, respectively, projecting laterally from their inner sides to define a guide slot 70 (FIG. 3). The opposed edges of guide plates 68 and 69 converge rearwardly in such a manner that slot 70 guides the stalks into the inlet end of stripping slot 64 where the stalks are engaged by the screw flight 50 and fed in the direction of arrows 52 (FIG. 3).

The standing corn stalks are fed into guide slot 70 by gathering units designated by reference numerals 71 and including a pair of opposed, rearwardly converging gathering wheels 72 and 73 having inwardly projecting gathering fingers 74 carried at their peripheries. Gathering wheels 72 and 73 are rotated in a counter-clockwise direction as viewed in FIG. 1 by means of a drive chain 75 which in turn is connected to the main drive of the combine. The drive mechanism and details of gathering units 71 are the subject matter of applicant's co-pending application, Ser. No. 409,134, entitled Gathering Unit for Corn Harvesters, filed on even date herewith, the entire disclosure of which is incorporated herein by reference.

In operation, as the combine advances along a row of standing corn, fingers 74 of the opposed gathering wheels 72 and 73 pull the stalks S into guide slot 70 and direct them rearwardly therein. The speed at which wheels 72 and 73 rotate is such that fingers 74 move the stalks rearwardly with respect to the ground at a faster rate than the ground speed of the combine. When the stalks reach the rear end of guide slot 70, they are engaged by the screw flights 50 of the stalk feeding and snapping roll 47 and are fed into stripping slot 64 in the direction of arrow 52 of FIG. 3.

As the stalks are fed transversely with respect to the direction of travel of the combine into slot 64, they are engaged by the radial blades 51 of the snapping portion 47b of roll 47 and pulled downwardly through the slot between the outer ends of blades 51 and concave surface of plate 54. Stripping slot 64 is smaller than the ears E on stalk S. Consequently, as the stalk is pulled through slot 64, the ears are snapped off and are deflected rearwardly by the rear edge of the forward stripping plate 60. The ears fall onto the rear stripping plate 61 and are deflected onto deck 18 by a ramp 76 pivoted between frame members 28 and 29 on a pin 77. Ramp 76 covers the main support bar 25. Knife bar 67 prevents the stalks from winding around the snapping roll and prevents foliage from becoming entangled with the roll. The stripped stalks are forced downwardly by portion 47b of roll 47 and are left on the ground beneath the combine. Ears E are fed into elevator 11 by auger 22 to be treated by the combine crop treating mechanism.

It is apparent to those skilled in the art that while a specific embodiment of the invention has been disclosed, various alterations and modification in the construction and arrangement of parts is possible without departing from the scope and spirit of the invention.

We claim:
1. A self-propelled corn harvester movable along the axis of a row of corn stalks including a picking unit for removing ears of corn from the standing stalks; gathering means for guiding and feeding the standing stalks into said picking unit, said picking unit including means defining a stripping slot and stalk feeding and snapping means for feeding the stalks from said gathering means into said stripping slot and pulling the stalks through said stripping slot to remove the ears of corn therefrom, said stripping slot and snapping means being disposed transversely of the rows of corn and the direction of travel of the harvester, said snapping means including a screw conveyor for feeding the stalks into said stripping slot, at least one radial blade on said screw conveyor extending axially between the conveyor screw flights for engaging the stalks in the stripping slot and pulling them downwardly through the stripping slot, said snapping means further including a stationary plate member extending parallel to the axis of said screw conveyor and having a concave surface substantially concentric with the outer periphery of said screw conveyor for cooperating with said radial blades for pulling the stalks through said stripping slot.

2. A corn harvester as defined in claim 1 wherein said gathering means comprises a pair of wheels mounted forwardly of the picking unit and rotatable in rearwardly and upwardly converging planes and a plurality of inwardly projecting fingers on the periphery of each of said wheels for engaging the standing corn stalks and directing them rearwardly into the picking unit.

3. A combine having a main body, an elevator mounted on the main body for vertical, pivotal movement, a harvesting table supported by the elevator, said harvesting table having end walls joined by a deck and transverse conveying means supported between the end walls for conveying harvested crop material from the deck of the harvesting table to the elevator, a corn harvesting attachment having spaced stripping plates defining a stripping slot, stalk feeding and snapping means disposed beneath said stripping slot for pulling stalks through the stripping slot and removing the ears therefrom, gathering means for guiding and feeding standing stalks into the path of said stalk feeding and snapping means, and means detachably mounting the corn harvesting attachment on the harvesting table with the stripping plates supported above the deck and extending transversely to the direction of travel, deflecting means for causing the removed ears to fall from the stripping plates onto the deck to be carried by the transverse conveying means to the elevator.

4. A combine as defined in claim 3 wherein said stalk feeding and snapping means includes an auger having a feeder portion for feeding stalks into the space between the stripping plates and a snapping portion extending beneath the stripping plates in substantially parallel relationship therewith, and at least one radial blade extending axially along the snapping portion for engaging the stalks and pulling them through the space between the stripping plates.

5. A combine as defined in claim 3 wherein said deflecting means is defined by the rear edge of the forward of said stripping plates, said forward stripping plate being positioned above the other stripping plate.

6. A combine as defined in claim 3 further including a ramp supported on said corn harvesting attachment for pivotal movement about a transverse axis adjacent the stripper plates for overlying the means detachably mounting the corn harvesting attachment on the harvesting table for guiding the corn ears deflected from the stripping plates onto the deck of the harvesting table.

7. A combine as defined in claim 3 wherein said means detachably mounting the corn harvesting attachment on the harvesting table includes a support bar extending between the end walls of the harvesting table, and means interconnecting the corn harvesting attachment with said support bar permitting the position of the corn harvesting attachment to be selectively adjusted along the length of the support bar.

8. A combine as defined in claim 3 wherein said gathering means comprises a pair of wheels projecting forwardly from said corn harvester attachment and rotatable in opposed, rearwardly converging planes, and inwardly projecting fingers on the opposed faces of said wheels near the periphery thereof for engaging the standing corn stalks and feeding them into said guide slot.

9. A combine including a main body, an elevator mounted on the main body for vertical pivotal movement, a harvesting table supported by the elevator, conveying means supported on the harvesting table for conveying crop material from the harvesting table to the elevator, and a corn harvesting attachment detachably supported on the harvesting table having spaced stripping plates, stalk feeding and snapping means for feeding standing corn stalks between said stripping plates and pulling the stalks through said stripping plates to remove the ears of corn therefrom, and gathering means for guiding and feeding standing stalks into the path of said stalk feeding and snapping means as the combine advances axially along rows of corn stalks, said stripping plates and stalk feeding and snapping means being disposed transversely to the direction of travel of the combine, said stalk feeding and snapping means including an auger having a feeder portion for feeding stalks into the space between the stripping plates and a snapping portion extending beneath the stripping plates in substantially parallel relationship therewith, and at least one radial blade extending axially along the snapping portion for engaging the stalks and pulling them through the space between the stripping plates, a stationary snapping plate extending substantially parallel to the axis of said auger and having a concave surface complementary with and spaced from the path of the outer edge of said blade for cooperating with said blade to pull the stalks through the space between the stripping plates.

10. A combine as defined in claim 9 wherein said stripping plates include a forward stripping plate and a rear stripping plate with the opposed edges of said forward and rear stripping plates being spaced vertically as well as horizontally, said forward stripping plate being positioned above the rear stripping plate to deflect the ears rearwardly onto said harvester table.

11. A combine as defined in claim 10 further including a knife bar extending parallel to the axis of said auger and disposed adjacent the periphery thereof at a position remote from said stripping plates for preventing entanglement of crop material with said auger.

12. A combine as defined in claim 11 further including a support bar supported on the forward edge of said harvesting table and disposed transversely of the direction of travel of the combine, said corn harvesting attachment being supported on said support bar; and means interconnecting said corn harvesting attachment with said support bar permitting the position of said corn harvesting attachment along the length of said support bar to be selectively adjusted.

13. A combine as defined in claim 12 wherein said last named means includes laterally projecting plate members on said corn harvesting attachment having openings therein, a series of spaced openings in said support bar along the length thereof, and pin means engageable with the openings in said plate and selected ones of the openings in said support bar.

14. A combine as defined in claim 13 further including a ramp supported on said corn harvesting attachment for pivotal movement about a transverse axis adjacent the rear edge of said rear stripper plate for overlying said support bar and directing the ears of corn onto the harvesting table into the path of said conveying means.

15. A combine as defined in claim 14 further including a pair of laterally spaced dividers projecting forwardly from said corn harvesting attachment, and spaced guide plates projecting inwardly from the opposed sides of the dividers to define a rearwardly converging guide slot for guiding the stalks into the path of said auger.

16. A combine as defined in claim 15 wherein said gathering means comprises a pair of wheels projecting forwardly from said corn harvester attachment and rotatable in opposed, rearwardly converging planes, and inwardly projecting fingers on the opposed faces of said wheels near the periphery thereof for engaging the standing corn stalks and feeding them into said guide slot.

References Cited

UNITED STATES PATENTS

| | | | |
|---|---|---|---|
| 1,822,328 | 9/1931 | Whitaker | 56—15 |
| 1,964,579 | 6/1934 | Hyman | 56—119 |
| 2,604,750 | 7/1952 | Fergason | 56—104 |
| 2,903,836 | 9/1959 | Sheets | 56—104 |
| 3,070,939 | 1/1963 | Schwartz | 56—2 |
| 3,088,261 | 5/1963 | Lagouarde | 56—18 |

ABRAHAM G. STONE, *Primary Examiner.*

P. A. RAZZANO, *Assistant Examiner.*